July 31, 1923.  1,463,581
C. H. HATHAWAY ET AL
AUTOMOBILE BUMPER
Filed Aug. 23, 1921
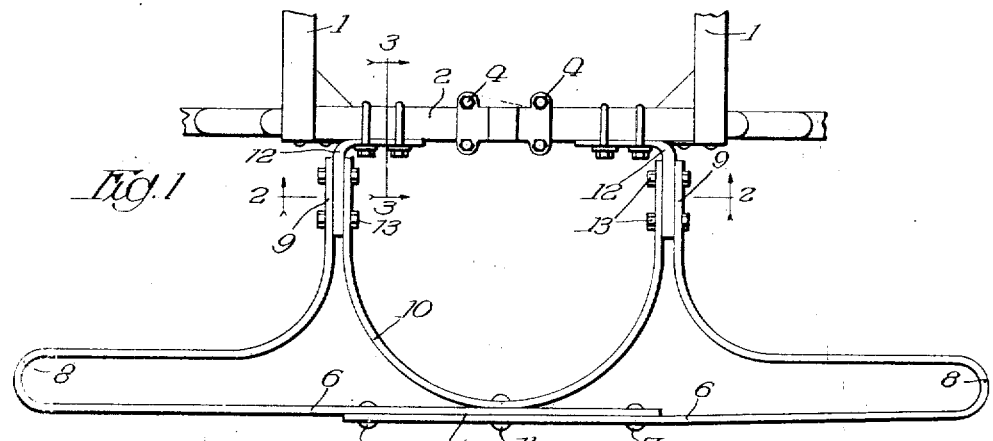
Fig. 1
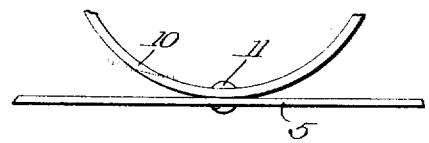
Fig. 2
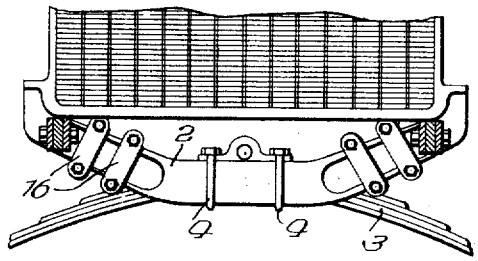
Fig. 3
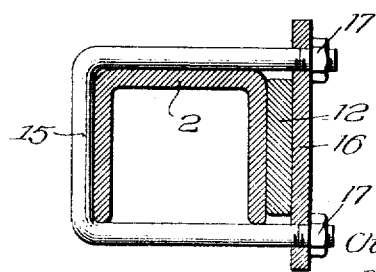
Inventors
Charles H. Hathaway
William A. Starck
By Edwin B. H. Tower Jr.
Attys Patented July 31, 1923.

1,463,581

UNITED STATES PATENT OFFICE.

CHARLES H. HATHAWAY, OF WEST ALLIS, AND WILLIAM A. STARCK, OF MILWAUKEE, WISCONSIN, ASSIGNORS TO BADGER MANUFACTURING CORPORATION, OF MILWAUKEE, WISCONSIN, A CORPORATION OF DELAWARE.

AUTOMOBILE BUMPER.

Application filed August 23, 1921. Serial No. 494,647.

*To all whom it may concern:*

Be it known that we, CHARLES H HATHAWAY and WILLIAM A. STARCK, citizens of the United States, residing, respectively, at West Allis, in the county of Milwaukee and State of Wisconsin, and Milwaukee, in the county of Milwaukee and State of Wisconsin, have invented new and useful Improvements in Automobile Bumpers, of which the following is a specification.

This invention relates to an automobile bumper.

This bumper is particularly applicable to an automobile the frame of which has a transverse end bar.

An object of the invention is to provide an automobile bumper capable of withstanding the severe shocks and strains to which it may be subjected in service.

Another object is to provide an automobile bumper, the attachment of which to an automobile frame does not require the mutilation or weakening of the frame, and which may be easily and quickly secured thereto so as to be held rigidly in position.

Other objects and advantages will hereinafter appear.

The bumper is illustrated as applied to the frame of a Ford automobile, although it may be applied to the frames of other automobiles having transverse end frame bars.

The views of the drawings are:

Fig. 1 is a top plan of the bumper attached to the front end frame bar of the automobile.

Fig. 2 is a transverse section on line 3—3 of Fig. 1.

Fig. 3 is a vertical section on line 4—4 of Fig. 1.

Fig. 4 is a top plan of a portion of a bumper, the impact bar of which is formed from a single spring metal strip.

The automobile frame to which the bumper is shown attached, comprises longitudinal side bars 1 and a front end channel bar 2, rigidly secured at its ends to the forward ends of the side bar 1.

The end channel bar 2 has an intermediate section lower than the ends thereof. The front spring 3 which supports the automobile frame is seated within the channel of the lower intermediate section of the end bar 2 and is rigidly fastened thereto by U bolts 4.

Fig. 1 shows an automobile bumper having an impact bar 5 formed of resilient material so constructed that the bar will be yieldable in a horizontal direction and relatively rigid or non-yieldable in a vertical direction.

The impact bar 5 is made of two similar sections, the transversely extending ends of which overlap for a considerable distance and are rigidly fastened together by rivets 7 or other fastening means.

Each impact bar section 6 has a looped end 8 and a rearwardly extending supporting arm 9.

A U shaped reenforcing bar 10 is rigidly fastened at its base to the impact bar 5 by means of a rivet 11, or other fastening means.

The front ends of the reenforcing bar extend rearwardly from the impact bar 5 and are positioned adjacent the free ends of the supporting arms 9.

The bumper is attached to the automobile end frame 2 by means of L shaped brackets 12, which are formed from resilient bar material.

The forwardly extending arm of each L shaped bracket 12 is positioned between the free end of one of the impact bar supporting arms 9 and one of the free ends of the U shaped reenforcing bar 10. Bolts 13 or other fastening means extending through these three members rigidly fasten the same together.

Of course, other fastening means may be employed.

The laterally extending arm of each L shaped bracket is formed so that it abuts the front of the transverse end frame bar 2.

The L shaped attaching brackets 12 are rigidly fastened to the transverse end channel bar 2 by means of U bolts 15, co-operating clamping plates 16 and nuts 17.

Fig. 4 shows a portion of an automobile bumper the impact bar 5 of which is formed of a single resilient bar.

The transverse impact bar of the bumper is spaced a considerable distance from the automobile frame, and when the automobile is moving over rough pavements or roads the impact bar tends to vibrate vertically. This tendency to vertical vibration, however, is resisted by the auxiliary or reenforcing bar 10, which also strengthens the entire bumper.

The bumper may be attached to the end frame bar of the automobile without drilling any holes in the frame or otherwise mutilating or weakening the same.

The bumper may be easily and quickly attached to the automobile frame without employing any special tools, merely an ordinary wrench being required to tighten the nuts of the U bolts.

The invention claimed is:

1. A bumper for attachment to an automobile frame having a transverse end bar, comprising L-shaped supporting brackets each bracket having an arm abutting the front of the transverse frame bar and the other arm projecting forwardly therefrom, means comprising U-shaped bolts and clamping plates for rigidly fastening the L-shaped brackets to the frame end bar, a transverse impact bar provided with rearwardly extending supporting arms having the free ends thereof juxtaposed to the projecting arms of the L-shaped brackets, a U-shaped reinforcing bar rigidly fastened at its base to the transverse impact bar and having its free ends juxtaposed to the free arms of the L-shaped bracket and the free ends of the rearwardly extending supporting arms, and means extending through the juxtaposed free ends of the bracket reinforcing bar and projecting arms and rigidly fastening the same together.

2. A bumper for attachment to an automobile frame having a transverse end bar, having, in combination, L shaped supporting brackets, each having an arm abutting the front of the transverse frame bar and the other arm projecting forwardly therefrom, means comprising U bolts and clamping plates for rigidly fastening the L shaped brackets to the frame end bar, a transverse impact bar provided with rearwardly extending supporting arms having the free ends thereof positioned adjacent the projecting arms of the L shaped brackets, a U shaped reenforcing bar rigidly fastened at its base to the transverse impact bar and having its free ends positioned on the other side of the free arms of the L shaped bracket, and means extending through the free ends of the L shaped impact supporting arms, bracket arm and reenforcing bar and rigidly fastening the same together.

In witness whereof, we have hereunto subscribed our names.

CHARLES H. HATHAWAY.
WILLIAM A. STARCK.